United States Patent [19]

Thomas et al.

[11] 4,159,614
[45] Jul. 3, 1979

[54] LAWN MOWER CONTROLS

[75] Inventors: George A. Thomas, Des Moines; C. Dean Peterson, Ankeny, both of Iowa

[73] Assignee: AMF Incorporated, White Plains, N.Y.

[21] Appl. No.: 846,233

[22] Filed: Oct. 27, 1977

[51] Int. Cl.² .................................... A01D 35/26
[52] U.S. Cl. ..................... 56/11.6; 56/11.1; 56/11.8; 74/805
[58] Field of Search ............ 56/11.8, 11.6, 11.7, 56/11.1; 74/805; 180/19 R

[56] References Cited

U.S. PATENT DOCUMENTS

| | | |
|---|---|---|
| 3,192,799 | 7/1965 | Pamplin .............................. 74/805 |
| 3,411,275 | 11/1968 | Mattson et al. .................... 56/11.8 |
| 3,466,938 | 9/1969 | Wulff .................................. 56/11.8 |
| 3,493,088 | 2/1970 | Hoff ................................... 56/11.8 |
| 3,818,686 | 6/1974 | Haffner et al. ..................... 56/11.8 |
| 3,984,967 | 10/1976 | Jones ................................. 56/11.8 |
| 4,027,541 | 6/1977 | Nishioka ............................ 74/805 |

Primary Examiner—Jay N. Eskovitz
Attorney, Agent, or Firm—George W. Price; Walter Lewis

[57] ABSTRACT

The rear wheels of a rotary mower are driven off the blade shaft by a compact and cylindrical speed reducer mounted directly on the rear wheels drive axle. The speed reducer is drive connected to the blade shaft by a variable pulley-belt system to provide an adjustment in the speed of the mower along the ground, whereas start and stop of the mower is controlled by a wrap-around spring type clutch on the speed reducer.

3 Claims, 9 Drawing Figures

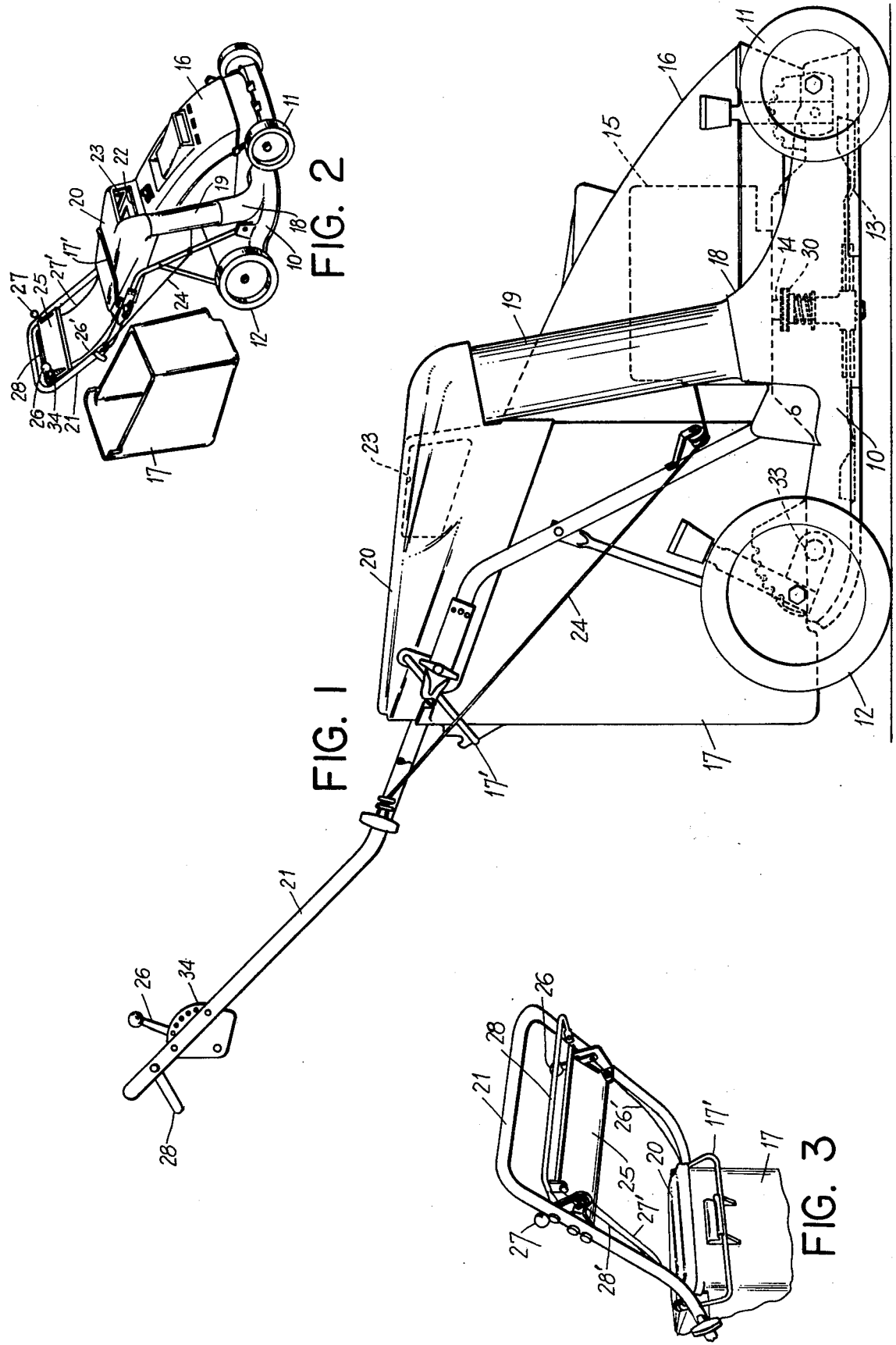

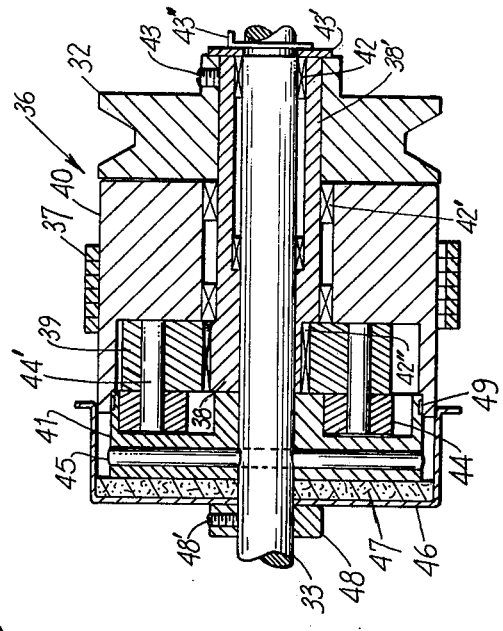
FIG. 7
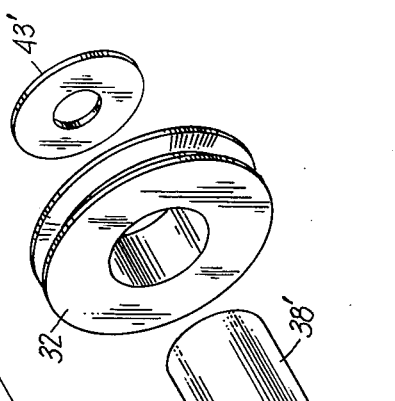
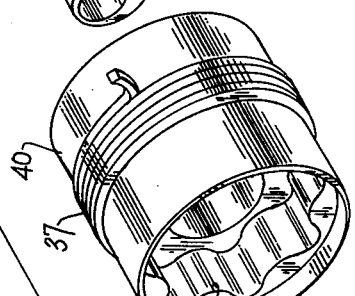
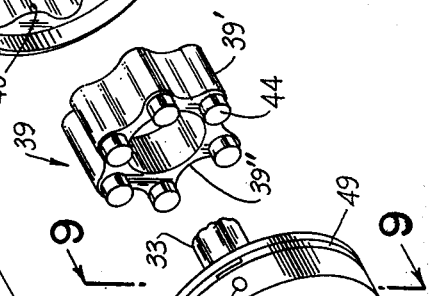
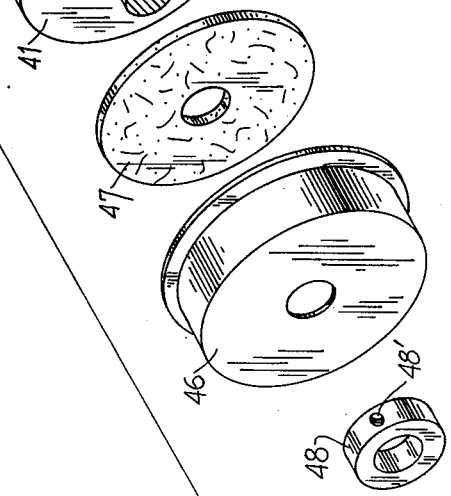
FIG. 8
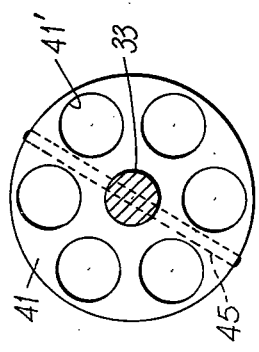
FIG. 9

LAWN MOWER CONTROLS

This invention relates to lawn mowers, and more particularly, to improvements in the controls for rotary type lawn mowers.

The invention has been incorporated in the rotary type lawn mower heretofore disclosed in pending George A. Thomas Des. Ser. No. 761,043 filed Jan. 21, 1977, and George A. Thomas, et al. Ser. No. 819,747 filed July 28, 1977. Therefore, in the accompanying three sheets of drawings only those parts thereof will be described which are necessary for an understanding of the instant invention. The two referred to pending patent applications are assigned to the same assignee as the instant one.

Figure 4:
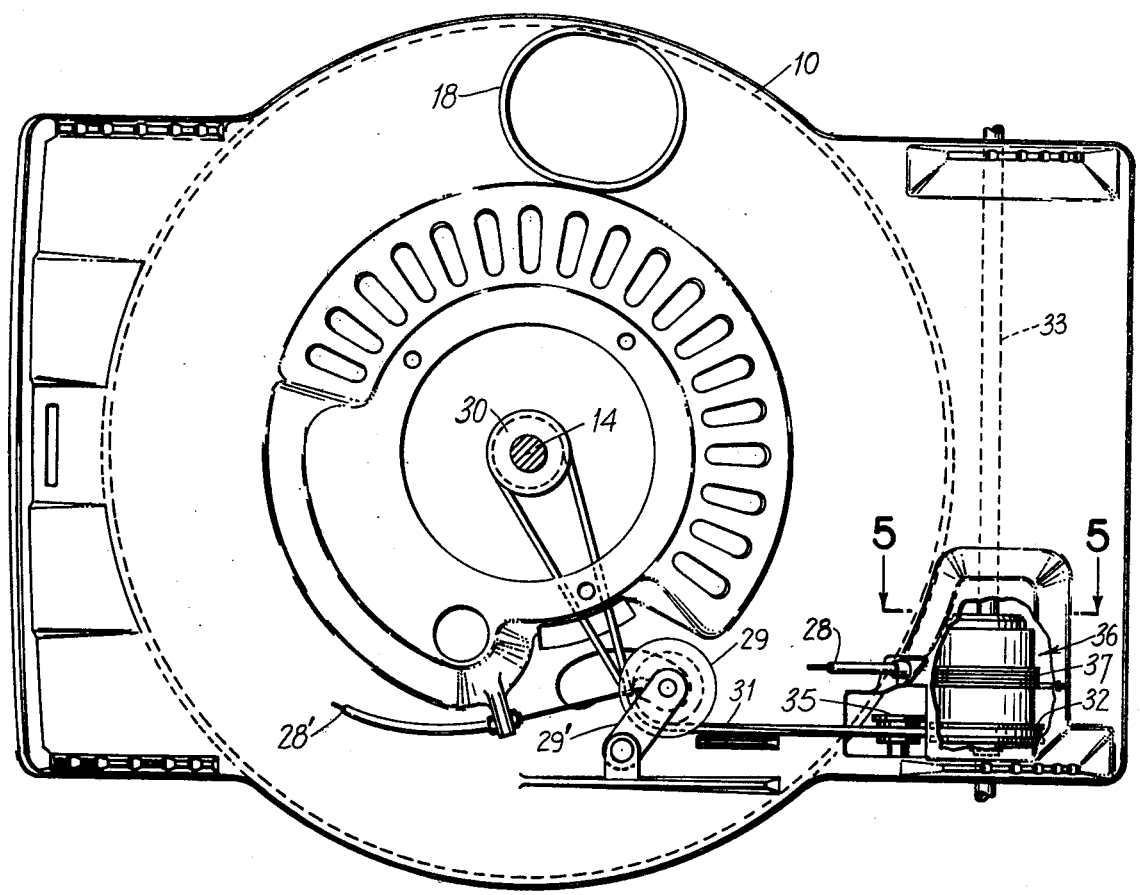
Figure 5:
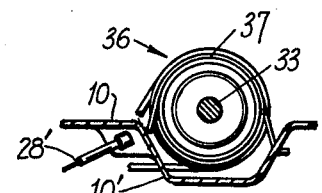
Figure 6:
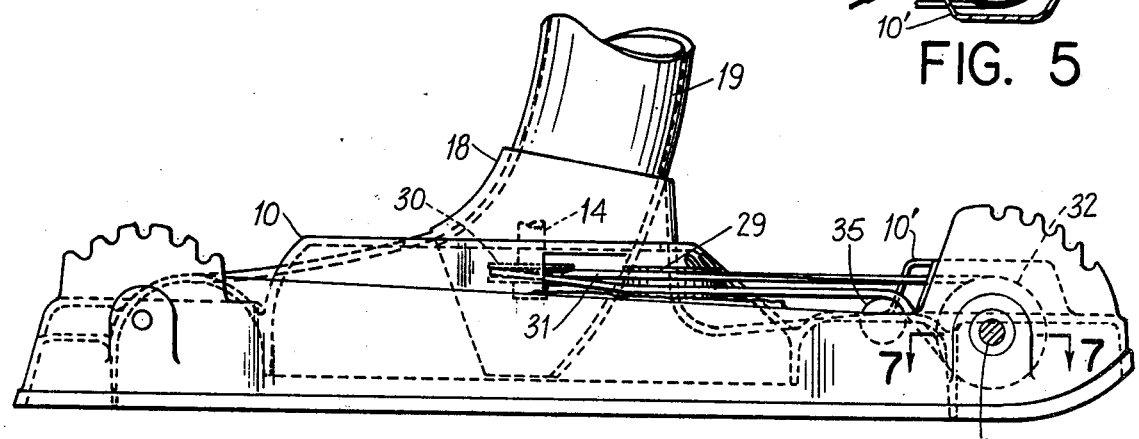

In the drawings
FIG. 1 is a side view of the mower;
FIG. 2 is a front perspective view thereof;
FIG. 3 is a partial rear perspective view thereof;
FIG. 4 is a top plan view of the mower deck;
FIG. 5 is a sectional view taken along the section line 5—5 of FIG. 4;
FIG. 6 is a side view corresponding to top view FIG. 4;
FIG. 7 is an enlarged sectional view taken along the section line 7—7 of FIG. 6 to show the internal parts of the speed reducer;
FIG. 8 is an exploded perspective view of the speed reducer; and
FIG. 9 is a sectional end view taken along the section line 9—9 of FIG. 8.

Referring now first to the first sheet of drawing (FIGS. 1-3), briefly, the mower comprises a generally rectangular shaped deck 10 movably mounted on a pair of front and rear wheels 11 and 12 respectively. As will be described more fully hereinafter, the rear wheels 12 are positively driven, whereas the front wheels 11 are free wheeling, although the opposite could be true.

A grass cutting blade 13 is positioned beneath the deck 10 on a shaft 14. Shaft 14 is driven by a suitable power means 15 mounted on the top of deck 10. Power means 15 could be an electric motor; however, in the mower shown, it is a small gasoline engine which is covered by an engine shroud 16.

Positioned on the deck 10 behind the engine 15 is a slide out or drawer type grass catcher box 17. Cut grass is conveyed from beneath the deck 10 to above the deck 10 through a cut grass discharge 18 and tube 19 up into and against a cut grass-air separator 20.

Separator 20 is mounted above box 17 between the two legs of a generally U-shaped mower handle 21. Handle 21 is affixed at its bottom to opposite sides of the deck inboard of the rear wheels 12. The separator 20 is located between the two legs of the handle 20 and so is the box 17.

Briefly, the cut grass is separated out from the incoming mix of cut grass and air in the separator 20. The grass falls down into the box 17, and the clean air exits out of the device through front and side exhausts 22 and 23 respectively. The box is locked closed in the position shown in FIG. 1 by a latch 17', see FIG. 3, and when latch 17' is opened, the box 17 can be withdrawn for emptying in the manner shown in FIG. 2; that is, by sliding it rearwardly.

For those interested in a more detailed description of the mower parts so far briefly described, reference can be had to the previously referred to George A. Thomas, et al. Ser. No. 819,747 filed July 28, 1977.

Now for a brief description of the mower controls. Positioned along the right-hand side of the mower handle 21 (as viewed from the perspective of a mower user standing or walking behind the upper bite of the handle 21) is an engine start pull cord 24. Positioned at the upper end of handle 21 is a control panel 25 with suitable indicia marked thereon, right and left side knobbed handles 26 and 27 respectively, and a dead man type control bar 28.

Referring now also to the second sheet of drawing (FIGS. 4-6), the knob 27 is merely an engine throttle (speed control) by virtue of a cord or cable 27' which extends therefrom to the engine. The knob 26 is a speed selector. It controls a cord or cable 26' which extends to a double idler pulley 29 (see FIG. 4) of a variable pulley belt drive system comprising variable pulley 30 on engine output shaft 14, pulley belt 31, and a pulley 32 which is mounted on the drive axle 33 of the rear wheels 12. Idler pulley 29 is pivotally mounted on deck 10 on a swing arm 29' which is spring biased to the right when viewing FIG. 4. So, when cable 26' is relaxed, idler pulley 29 swings to the right to relax on the belt 31. In this condition of the pulley belt system, the system is in high output speed. This is when the knob 26 is pushed forward or down. To get in low output speed, the knob 26 is pulled back or up. This pulls on the cord 26' and swings arm 29' and idler pulley 29 to the left to make the belt taut. So, the belt 31 is further embedded in the variable pulley 30 so that in effect the linear speed of the belt 31 per revolution of engine shaft 14 is reduced.

The above is true because the belt 31 is V-shaped in cross section and runs in the pulley 30 which is also V-shaped, but in addition its two halves are split, the bottom half, see FIG. 1, being spring biased toward the top half. So, when the belt 31 is loose, it is running at the outer perimeter of the pulley 30 or at higher linear speed. However, as it is tightened, it becomes more and more embedded in the pulley 30. That is to say, it runs on the pulley 30 closer to its inner perimeter, or at slower linear speed. Suitable indentations (holes) are formed in a plate 34 adjacent the knob 26 to cooperate with a not shown lug or the like on knob 26 so as to hold the knob 26 in any one of a plurality of differently selected speed positions between low and high speed.

In the just described variable speed pulley belt system there is an idler roller 35 beneath the output end of the pulley belt 31 to hold the belt off the deck 10. The output pulley 32 is mounted to a very small and compact speed reducer indicated generally by the reference numeral 36, which will be described shortly in detail in connection with the third sheet of drawing (FIGS. 7-9). However, for the present, suffice to say that speed reducer 36 effects a gross fixed speed reduction between shafts 14 and 33 of the magnitude of 6 to 1, whereas the speed selector system 29-32 is only a fine speed selector to give low, medium, or high speed travel to the mower with respect to the ground.

The drive and no drive condition of the mower is controlled by the dead man bar 28. When the mower user's hand is on the bite of handle 21 and his fingers squeeze or raise bar 28, this pulls up on the cord or cable 28' connected thereto. The lower end of cable 28' is connected to a wrap around type spring clutch 37 on the speed reducer 36. When the spring clutch 37 is loose, the internal parts of the speed reducer 36 are merely spun by the pulley 32 but without driving axle 33. However, when the spring clutch 37 grabs on the speed reducer 36, then the internal parts of the speed reducer actually drive the axle 33 to rotate the rear wheels 12.

Referring to FIGS. 4-6, it will be seen that the rear end of spring 36 is anchored to the deck 10, whereas the cable 28' is connected to the front end thereof. A slight raised protuberance 10' is formed in the rear of the deck 10, and speed reducer 36 is partially positioned therein. The significance of the dead man control bar 28 is that the mower can travel only if the mower user is walking behind the mower and gripping the handle 21. If he should fall, walk away from it, or for any other reason leave the handle 21, the bar 28 will immediately be released so that the wrap around spring clutch 37 will automatically and instantaneously self-release or unwind from with respect to the speed reducer 36. That is to say, travel of the mower along the ground is instantaneously arrested the moment bar 28 is left unattended. This is a safety feature to prevent accidents from run away mowers; but still, it does not shut off the engine 15 or stop the blade from rotating. These parts should continue to run since the user may have merely momentarily released bar 28 to wipe his brow, or to make a U-turn or go around a bush or shrub, in which events one would merely stop positive drive of the rear wheels but not the mower blade. Of course, when the rear wheels are not being positively driven, they are free wheeling, as will be understood by those skilled in the art.

The details of the speed reducer 36 per se will now be described in connection with the third sheet of drawing (FIGS. 7-9). As seen therefrom, speed reducer 36 is a small and compact assembly of parts having a cylindrical shaped exterior. All the parts of the speed reducer are annular in shape and mounted directly on the drive axle 33. The speed reducer has two conditions with respect to the axle 33; namely, drive and no drive. In the drive condition, the spring 37 grabs the cylindrical exterior of the speed reducer, at which point the rotating internal parts of the speed reducer are effective to drive or rotate the axle 33 off the shaft 14 (by virtue of the pulley belt drive connection 30, 31, 32 therewith). However, in the no drive condition the spring 37 is loose with respect to the speed reducer cylindrical exterior (by virtue of release of handle 28 and cable 28') whereby the parts of the speed reducer continue to be rotated by the pulley 32 but they are ineffective to drive or rotate the axle 33.

As shown, the speed reducer 36 comprises an eccentric cam 38, a rotor 39 mounted thereon, a rotor housing 40 surrounding the rotor 39, and an output drive hub 41 at the left-hand end of the rotor housing 40 opposite the rotor 39. The eccentric cam is part of an imput drive sleeve 38' on roller bearings 42 on the wheel axle 33. The pulley 32 is keyed to the sleeve 38' as by a stud 43. At its right-hand end the speed reducer assembly is kept together as by a washer 43' and a retainer clip 43".

The rotor housing 40 is surrounded by the wrap around type spring clutch 37 and it is mounted on the sleeve 38' on roller bearings 42'. Its left-hand end is hollowed out and is given a special interior contour comprising a series of seven alternated lobes 40' and depressions 40". The exterior of the rotor 39 is similarly contoured except that the number of alternated lobes 39' and depressions 39" is one less; that is to say, six (this arrangement gives a 6:1 speed reduction between the shaft 14 and axle 33). The rotor 49 is mounted on roller bearings 42" on the eccentric cam 38.

On its left-hand face the rotor 39 has six rollers 44 mounted on pins 44' embedded in the rotor 39 at the lobes 39'. The output drive hub 41 has six holes 41' therein formed at its right-hand face opposite the rollers 44. That is to say, rollers 44 of the rotor 39 are positioned in the holes 41' of the output drive hub 41. Hub 41 is keyed to axle 33 as by a pin 45.

The remaining parts of the speed reducer assembly 36 comprises a dust cover 46, a dust seal 47, and an end collar 48 keyed to shaft 33 as by a stud 48'. The device is filled with grease to keep the parts lubricated, and part 49 is a grease seal ring.

In the operation of the device, assuming first that the dead man control bar 28 is squeezed to engage the spring clutch 37 with the rotor housing 40, this holds the rotor housing immobile. With the engine 15 running the pulley 30 and belt 31 is rotating the pulley 32. This causes the sleeve 38' to rotate the eccentric cam 38. This causes the rotor 39 to move orbitally, and since the rotor housing 40 is immobilized by the clutch spring 37, what the rotor 39 does is rotate inside the rotor housing 40 but in a direction opposite to that of the pulley, sleeve, and cam 32, 38', 38 respectively. That is to say, by virtue of the throw or the eccentricity of the cam 38 and the contoured surfaces on the rotor and rotor housing, the rotor steps or walks around the rotor housing one lobe at a time for each revolution of the cam (with six revolutions of the cam, the rotor will have made one complete revolution). As the rotor steps or walks around inside the rotor housing, it will carry the output drive hub 41, and its keyed axle 33 with it for same distance; that is 1/6th of a turn. This is because the rotor rollers 44 are positioned in the drive hub holes 41'. In this manner a 6:1 speed reduction is obtained at the axle 33 relative the RPM of the engine-blade shaft 14. The ratio can be more or less depending upon whether there are more or less lobes 39', 40'.

When the dead man clutch control bar 28 is released, the rotor housing 40 is no longer restrained from rotating. So, at this time the axle 33 is no longer positively driven because with the rotor housing being free the rotor no longer has a fixed surface around which to step or walk. (It should be appreciated that the stepping or walking of the rotor about the inside of the rotor housing is actually a continuous rotary movement.) Instead, what happens is that the rotor causes the rotor housing to turn at a 6:1 speed reduction as compared to the pulley 32, the rotor housing turning in the same direction as the pulley 32. The drive hub 41 is not turned at this time since the rotor is not turning. The rotor at this time merely goes through its orbital movement, and the size of the holes 41 relative the rollers 44 and throw of the eccentric 38 is such that the rotor can do this without moving the drive hub 41. With the clutch 37 off or disengaged, the rear wheels 12, or their axle 33 is free to be turned in either direction even though the pulley 32 is running. So, with the dead man control 28 released, the mower is free wheeling in either a forward or rearward direction. This is desirable for trimming around bushes, shrubs, and the like.

We claim:

1. In a rotary type lawn mower comprising a mower deck, front and rear pairs of wheels for said deck, a grass cutting blade below said deck, power means on said deck including a shaft extending through said deck from said power means to said blade, and a handle for the guiding said mower along the ground, said handle extending to the rear of said mower; improved means for driving one pair of said wheels and controlling said mower, comprising a drive axle for said one pair of wheels and a speed reducer on said drive axle for reducing the speed between said shaft and axle, a drive connection between said shaft and speed reducer, said speed reducer having a drive and no drive condition with respect to said axle, a clutch on said speed reducer for controlling said condition, and a manual control on said handle for controlling said clutch; said drive connection between said shaft and speed reducer comprising a variable one to provide different speeds to said axle for varying the speed of said mower along the ground, and another manual control on said handle for controlling said variable drive connection; said clutch comprising a wrap around spring on said speed reducer, and said variable drive connection comprising a split V pulley on said shaft, another V pulley on said speed reducer, a V drive belt interconnecting the two pulleys, and means controlled by said another manual control for controlling the tension of said belt on said pulleys.

2. In a mower, as in claim 1, said speed reducer comprising a plurality of annular parts mounted directly on said drive axle, said plurality of annular parts together comprising a compact speed reducer assembly having a generally cylindrical shaped exterior, said wrap around spring being mounted on said speed reducer cylindrical exterior, said speed reducer with said spring thereon being positioned beneath said mower deck, one end of said spring being anchored to said deck, and a control cable extending from the other end of said spring to said manual clutch control for operating said spring to alternately grab and release said speed reducer cylindrical exterior to alternately place said speed reducer in drive and no drive condition respectively with respect to said drive axle.

3. In a mower, as in claim 2, said speed reducer comprising an eccentric cam rotatable on said axle, a rotor rotatable on said cam, said rotor having a lobed exterior surface, a rotatable rotor housing about said rotor, said rotor housing having an interior lobed surface, said exterior lobed surface engaging said interior lobed surface as said cam is rotated, said drive connection between said shaft and speed reducer being adapted to rotate said cam, a drive connection between said rotor and axle, said clutch spring being operative to alternately restrain and free said rotor housing whereby said rotor is operative to respectively turn with respect to said rotor housing and turn therewith, said last mentioned drive connection comprising a drive hub affixed to said axle, rollers on said rotor at each of the lobes thereof, a plurality of holes in said drive hub equal in number to the number of said rollers, said rollers being positioned to said drive hub holes, said cam, rotor, rotor housing, and drive hub comprising a generally cylindrical shaped assembly of parts directly mounted on said axle and coaxial therewith, and said clutch wrap around spring being on the exterior surface of said rotor housing.

* * * * *